United States Patent [19]
Dammar

[11] 3,927,456
[45] Dec. 23, 1975

[54] COIL WINDING MACHINE WITH IMPROVED WIRE GRIPPING AND CUTTING MEANS

[75] Inventor: Raymon H. Dammar, Minneapolis, Minn.

[73] Assignee: Possis Corporation, Minneapolis, Minn.

[22] Filed: Apr. 2, 1971

[21] Appl. No.: 130,649

Related U.S. Application Data

[63] Continuation-in-part of Ser. No. 721,805, April 16, 1968, abandoned.

[52] U.S. Cl. ............... 29/205 C; 29/598; 242/7.05 B
[51] Int. Cl.[2] ......................................... H02K 15/09
[58] Field of Search ..... 242/7.05 B, 7.05 R, 7.05 A, 242/7.05 C, 7.02, 205 CM, 598, 597; 29/205 C, 205 CM, 598, 597

[56] References Cited
UNITED STATES PATENTS

| | | | |
|---|---|---|---|
| 2,947,427 | 8/1960 | Moore | 242/7.05 B X |
| 3,142,890 | 8/1964 | Adams et al. | 29/598 |
| 3,585,716 | 6/1971 | Steinke | 29/205 C |
| 3,628,229 | 12/1971 | Biddison | 29/205 C |

*Primary Examiner*—Billy S. Taylor

[57] ABSTRACT

An armature winding machine in which flyers rotating about an axis that intersects the axis of an armature core held in a winding receiving position wind wire drawn from a supply thereof onto the armature core, and wire gripping and wire cutting devices automatically grip the stretch of wire leading from each flyer to the armature core at the completion of the winding operation, and cut the same between the portions thereof in the grasp of the wire gripping devices and the armature, while the armature is still in the winding receiving position, so that the length of wire that is not a part of the wound armature and must be cut off is considerably shorter than was possible with prior winding machines. In the more sophisticated embodiment of the disclosed machine, the wire cutting devices cut the wire directly adjacent to the commutator tangs to which the starting leads and the ending leads of the wound armature are attached; but in all embodiments of the disclosed invention, the wire gripping devices hold the ends of the stretches of wire leading from the flyers from the instant they grasp the wire at the completion of the armature winding operation, until the next-to-be wound armature core has replaced the just-wound armature and the winding operation has been re-started.

34 Claims, 28 Drawing Figures

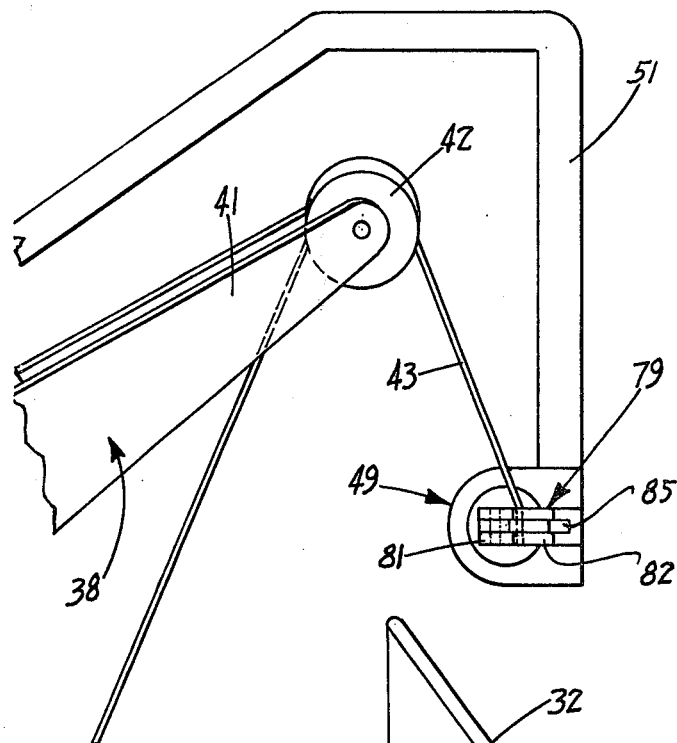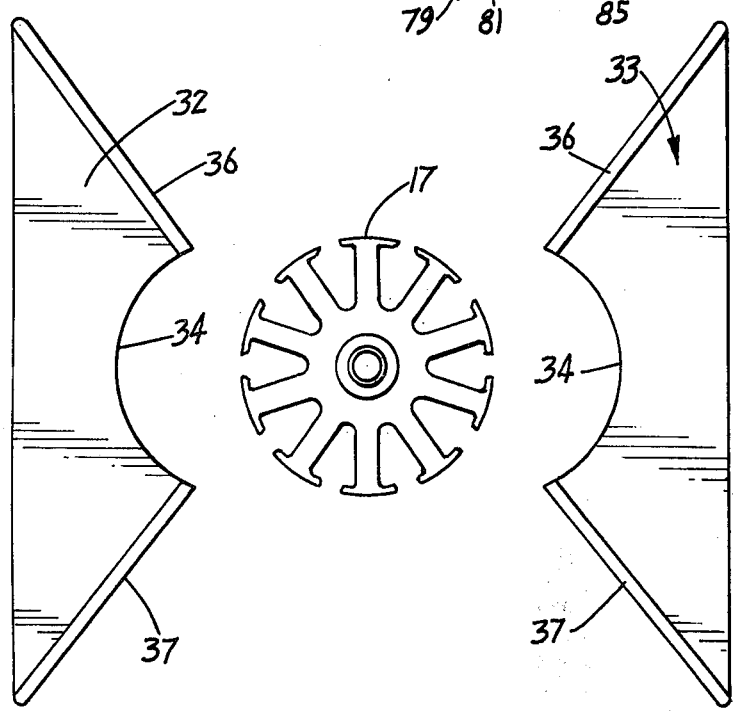

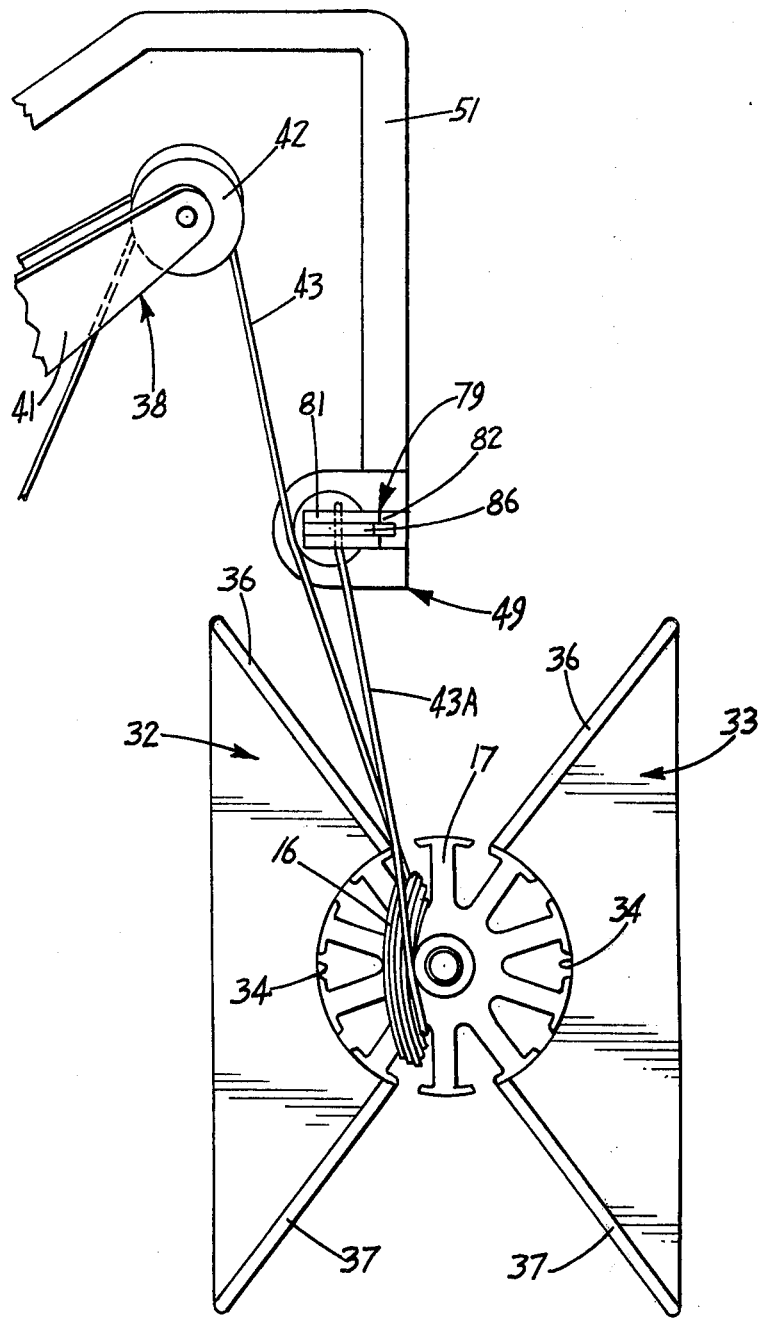
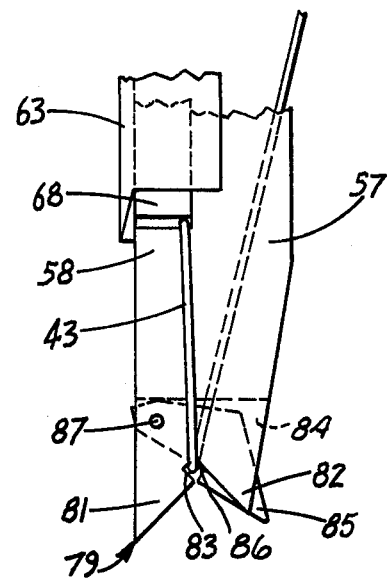
FIG. 3
FIG. 11

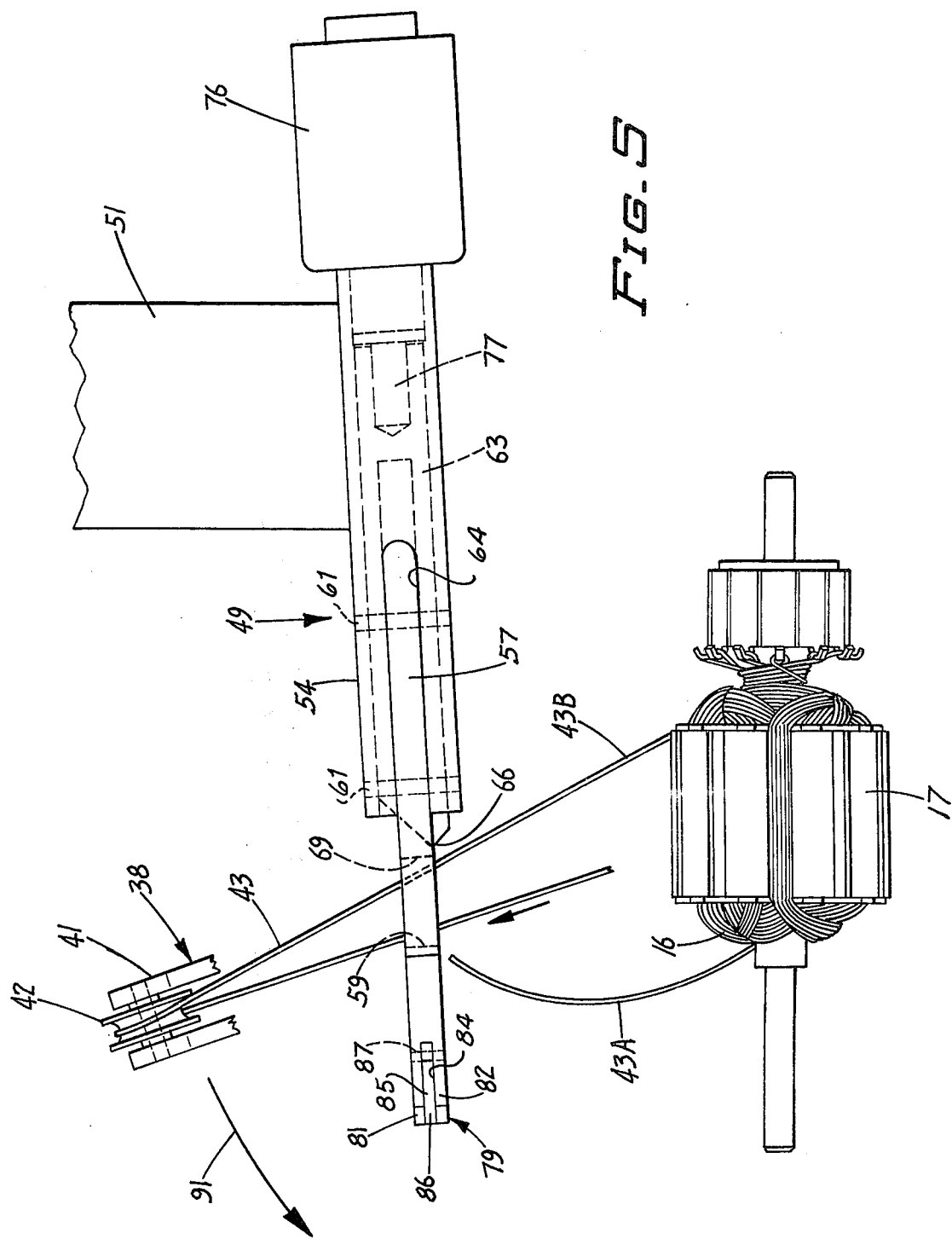

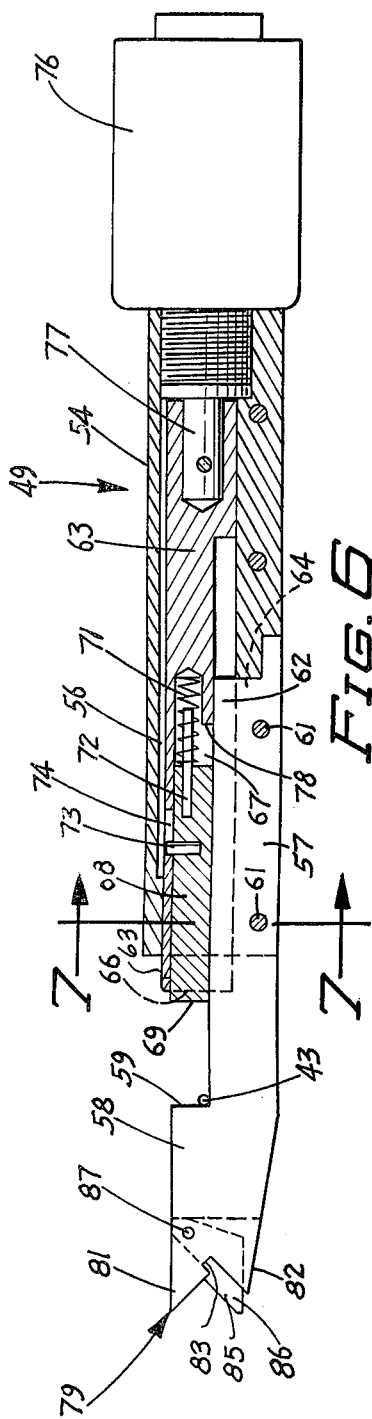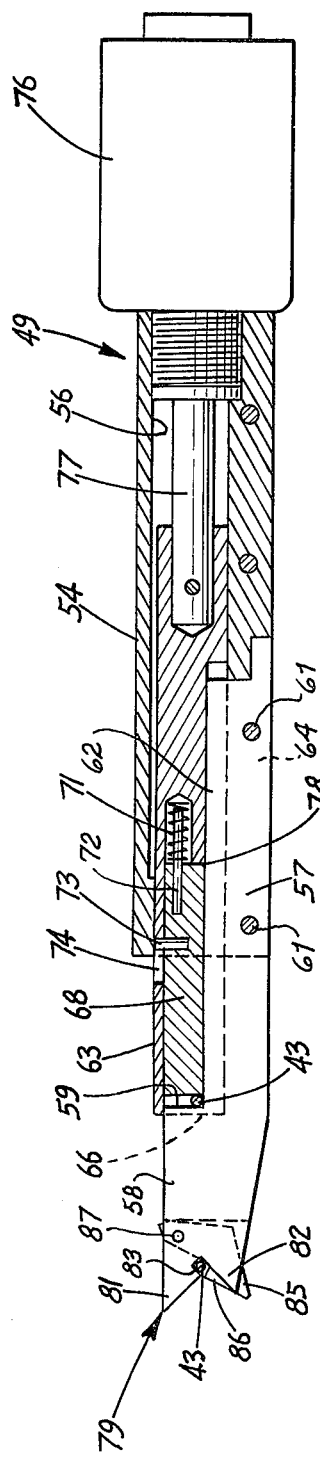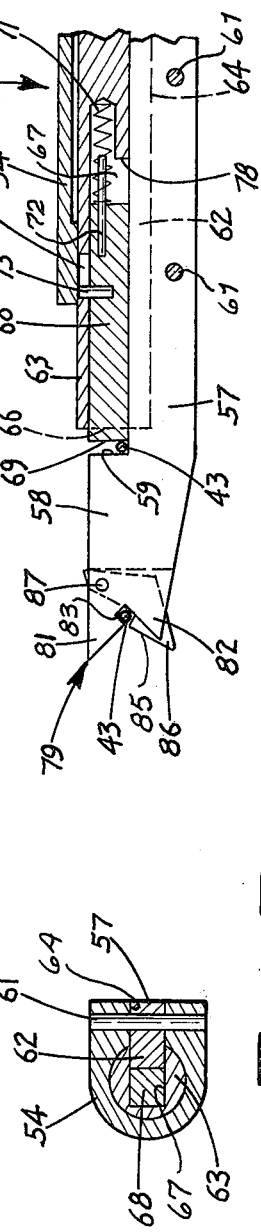

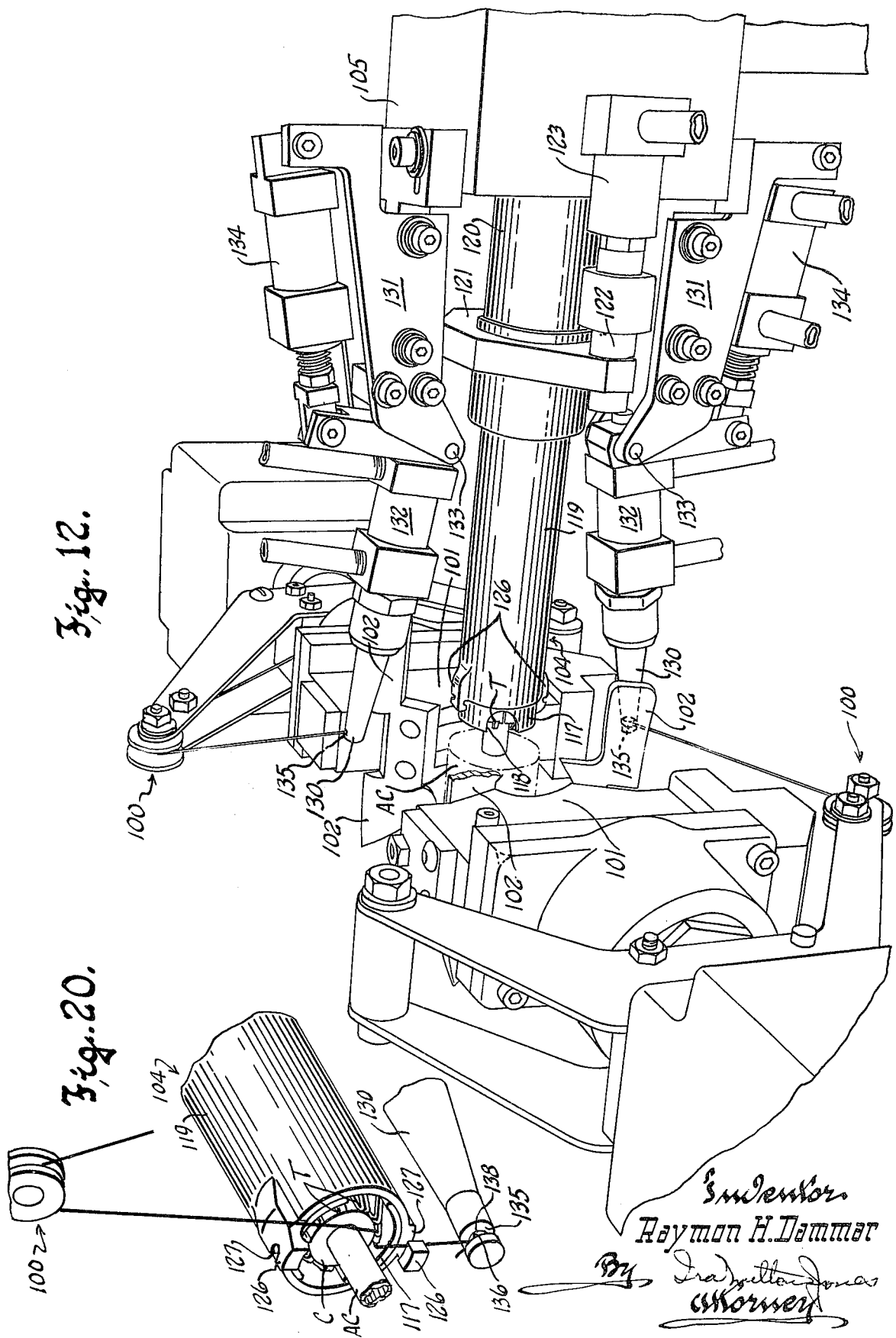

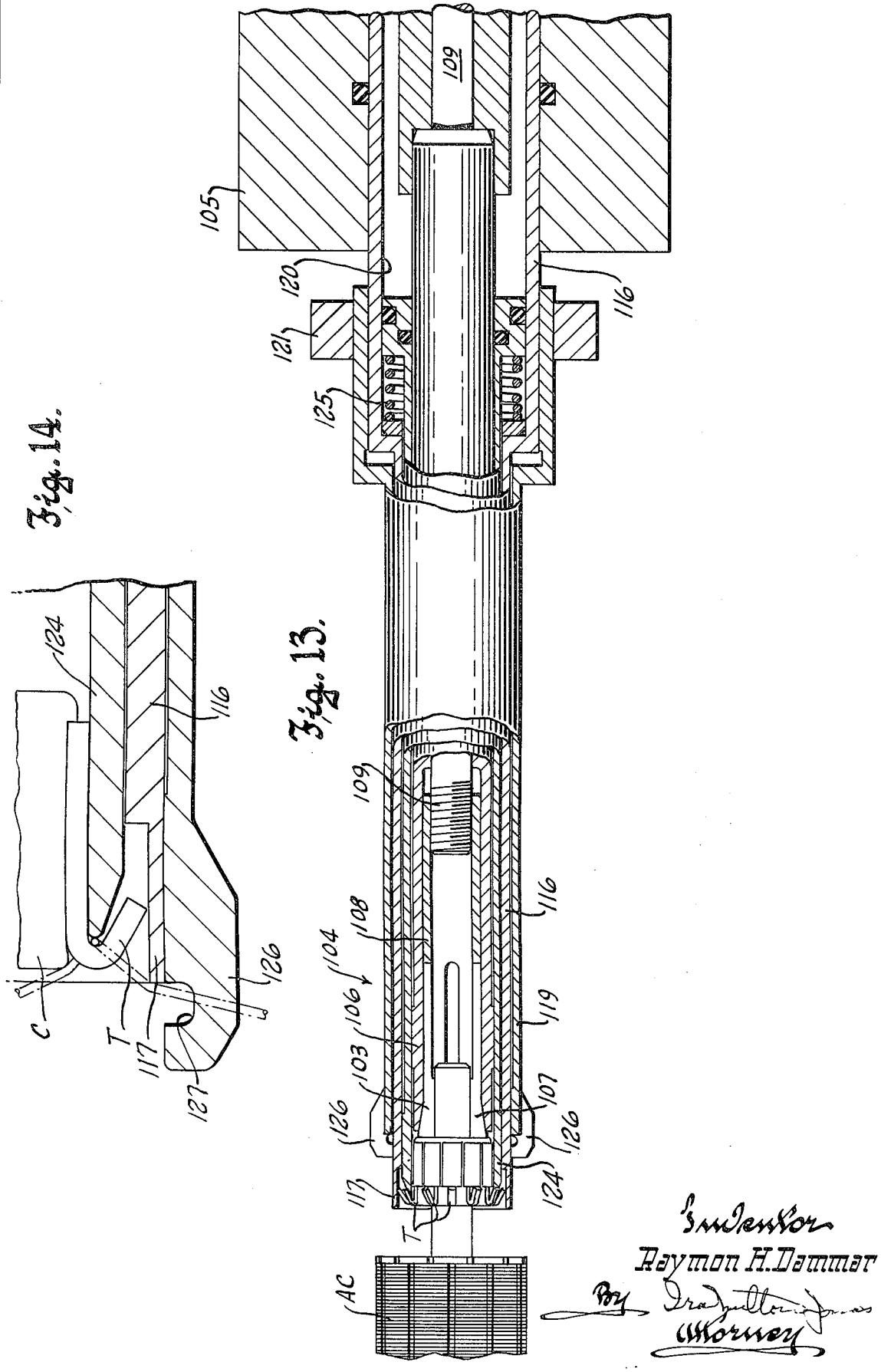

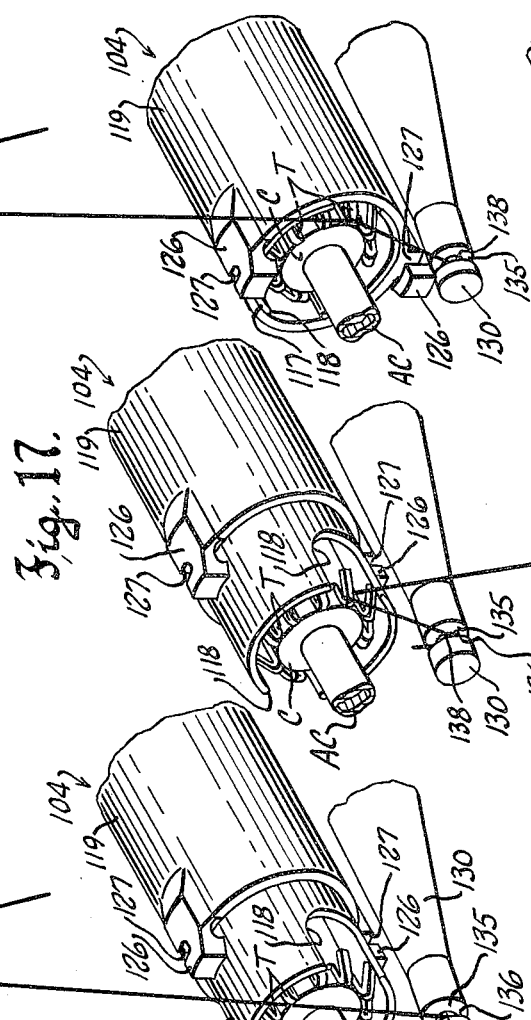

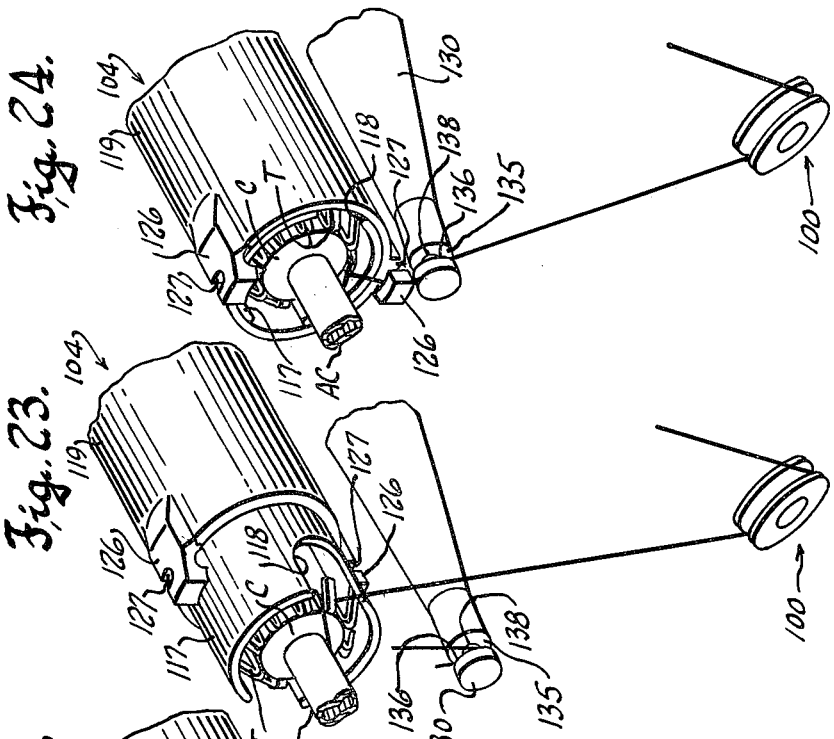

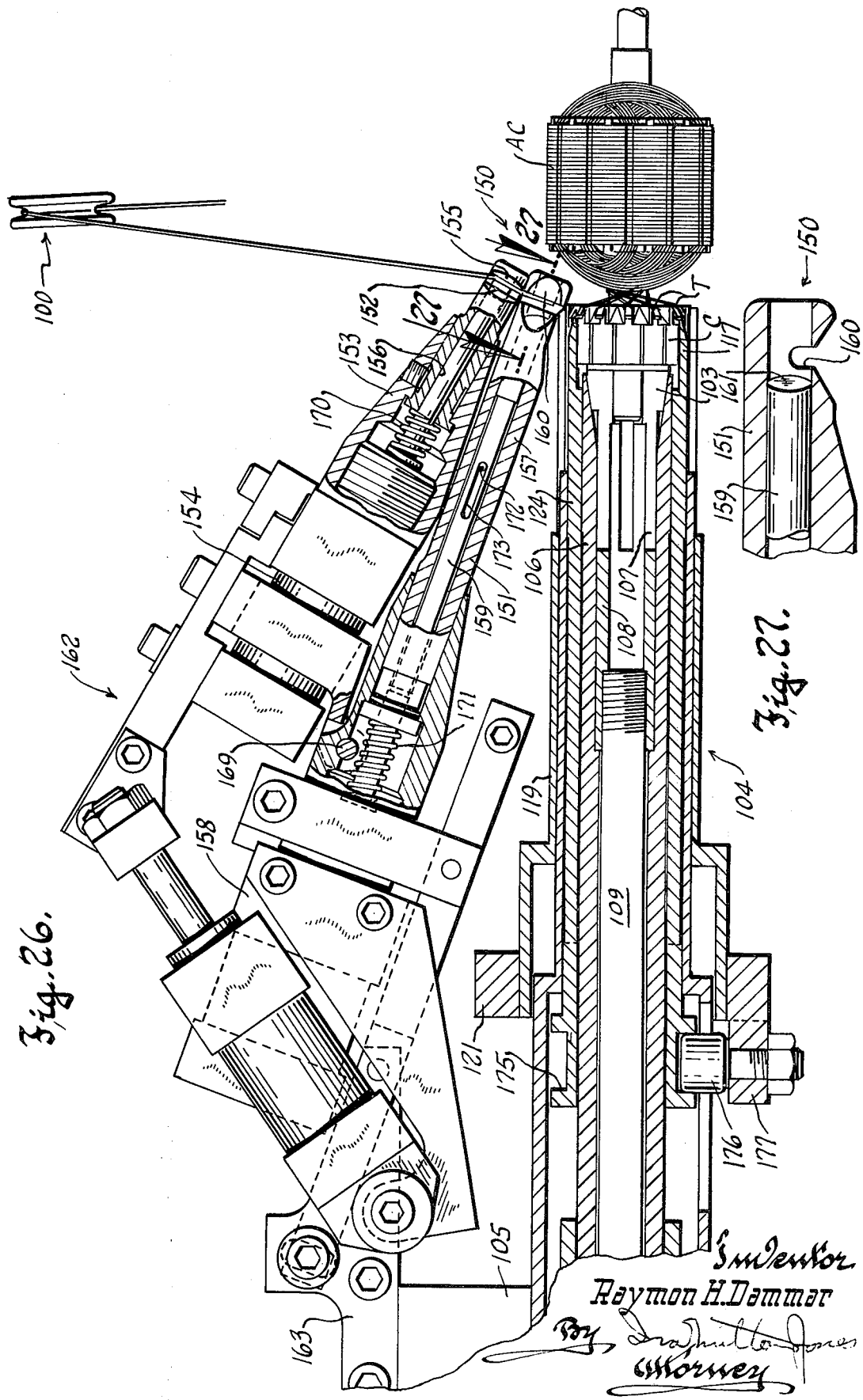

COIL WINDING MACHINE WITH IMPROVED WIRE GRIPPING AND CUTTING MEANS

This invention relates to coil winding machines of the type employed to automatically wind coils of wire into angularly spaced slots of armature cores and also automatically attach the leads that extend to and from those coils to the terminals or tangs of commutators associated with the armature core.

In such winding machines there are usually two flyers that rotate in opposite directions and in spaced orbits about a common axis which intersects and is normal to the axis of the armature core being wound. Each flyer draws wire from a supply thereof and winds it into a pair of angularly spaced core slots. Upon completion of each coil wound by a flyer, the ending lead from that coil is attached to a selected commutator tang, which attachment may be effected in the manner described in the pending application of Raymon H. Dammar, Ser. No. 787,426, now abandoned, and then — with the armature core indexed to bring other paired core slots into winding receiving positions — the flyers again wind coils onto the core. When all coils are wound, the stretches of wire that lead from the flyers to the core, must be severed to permit the wound armature core to be removed from the machine.

Although winding machines heretofore available had provision for automatically cutting these stretches of wire, the mechanism for doing so made the cut at a substantial distance from the wound armature. Thus, for instance, in the U.S. Pat. to Moore, No. 2,947,427, the stretches of wire that lead from the wound core at the completion of the winding operation remain uncut until winding of the next coil is begun. Hence, with the machine of the Moore patent, a wound armature core and a core being wound are tied together by relatively long lengths of wire, so that no matter where those lengths of wire are cut, a considerable amount of wire must be wasted.

The purpose and object of this invention, as was also the case in the copending application Ser. No. 721,805, filed Apr. 16, 1968, now abandoned, of which this application is a continuation-in-part, is to materially reduce the amount of wire that must be wasted in automatically winding slotted armature cores.

In the embodiment of the invention that formed the subject matter of the aforesaid application Ser. No. 721,805, the objective of the invention is achieved by providing wire gripping and wire cutting mechanism for each flyer that is located within the orbit of the flyer. In the two embodiments of the invention for the first time disclosed herein, wire gripping and wire cutting means is located between the planes defined by the orbits of the flyers in close juxtaposition to the commutator tangs to which the leads of the coils are attached and hence well within the orbits of the flyers, or more accurately, within an imaginary cylinder defined by the orbits.

Briefly summarized, the present invention contemplates a coil winding machine of the character described, in which suitable core gripping means holds an armature core assembly in position to be wound; a flyer rotatable about an axis substantially intersecting and normal to the axis of the armature core assembly in position to be wound, draws wire from a source thereof and winds it into a pair of angularly spaced core slots; wire gripping means is actuatable to grip the stretch of wire which leads from the flyer to the core upon completion of the last coil to be wound onto the armature core and cessation of coil winding rotation of the flyer; wire cutting means in juxtaposition to the wire gripping means severs the stretch of wire being held by the wire gripping means with the cut located between the wound armature core and the wire gripping means, so that upon severance of the wire the wire gripping means can and does retain its hold on the end of the wire drawn from the source thereof in preparation for the winding of the next succeeding armature core; and the gripping means is actuated to release the end of the wire in its grasp after winding of the next succeeding armature core is begun and to again grip the stretch of wire leading from the flyer to the armature core when the winding of the core is completed.

In addition to the foregoing which applies to all embodiments of the invention disclosed herein, the improved version of the invention disclosed for the first time in this application is distinguished by the fact that the wire outwardly of the commutator tang to which the starting lead of the armature winding is attached, as well as the wire outwardly of the tang to which the ending lead is attached, is severed directly adjacent to its respective commutator tang, so that when the wound armature is removed from the winding machine, there are no dangling wires to be trimmed off.

The improved version of the invention also contemplates having the wire gripping means move outwardly away from the armature core while it has the wire in its grasp, to remove slack in the stretch of wire leading from the commutator tang to the wire gripping means and draw it taut in preparation to being severed by the wire cutting means.

Still another feature of the improved version of the invention resides in the provision of means for holding a lead which has been attached to a commutator tang against displacement therefrom so that as soon as the stretch of wire of which the starting lead of an armature winding will be formed has been attached to its tang, the wire outwardly of that tang can be severed directly adjacent to the tang.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of the embodiments of the invention, constructed according to the best modes so far devised for the practical application of the principles thereof, and in which:

FIGS. 1 THROUGH 11 ILLUSTRATE THE EMBODIMENT OF THE INVENTION DISCLOSED IN THE PARENT APPLICATION — SER. NO. 721,805

FIG. 1 is a fragmentary front elevational view of a coil winding machine incorporating one embodiment of the invention;

FIG. 2 is an enlarged front elevational view of an armature core between the open core gripping chucks of the machine illustrated in FIG. 1, and illustrating one of the flyers and its associated wire gripping and cutting mechanism;

FIG. 3 is a view similar to FIG. 2, showing the relative positions of the wire gripping and cutting mechanism, the flyer and the core gripping chucks during the winding of a coil onto a slotted armature core;

FIG. 4 is a view similar to FIG. 2, showing the relative positions of the wire gripping and cutting mechanisms, the flyer and the core gripping chucks, with the latter again in their open positions at the end of a winding operation;

FIG. 5 is a side elevational view of one of the wire gripping and cutting mechanisms and of the wound armature, showing the starting lead released and the ending lead in position about to be gripped and severed;

FIG. 6 is a longitudinal sectional view of the wire gripping and cutting mechanism in the open wire receiving position;

FIG. 7 is a cross sectional view taken on the plane of the line 7—7 in FIG. 6;

FIG. 8 is a view similar to a portion of FIG. 6 showing the wire gripped but not yet cut;

FIG. 9 is a view similar to FIG. 6 but with the parts thereof in the positions they occupy after the wire has been cut;

FIG. 10 is an enlarged top plan view partially in section, of the wire holder that is located at the outer end of each gripping and cutting mechanism;

FIG. 11 is a top plan view of the wire holder, showing the same holding a lead.

FIGS. 12 THROUGH 24 ILLUSTRATE THE PREFERRED EMBODIMENT OF THE INVENTION

FIG. 12 is a perspective view of those portions of a coil winding machine requiring illustration to depict the preferred embodiment of the invention;

FIG. 13 is a side view, with parts broken away and in section, of the core holding and commutator shielding structure of the machine shown in FIG. 12;

FIG. 14 is a fragmentary detail view, in section and at an enlarged scale, of the front end portion of the structure shown in FIG. 13;

FIGS. 15, 16, 17 and 18 are perspective views of the core holding and commutator shielding structure, with a core in position therein and illustrating successive steps in the attachment of the starting lead to one of the commutator tangs of the core about to be wound;

FIG. 15a is a fragmentary detail sectional view through the wire gripping means;

FIG. 19 is a perspective view illustrating the attachment of the starting lead to its respective tang;

FIG. 20 (on Sheet 7) is a perspective view similar to FIGS. 15-18, but showing how the starting lead is brought into position to be severed;

FIGS. 21, 22, 23 and 24 are perspective views similar to FIGS. 15-18 and 20, but showing the sequence of events which occur during severance of the ending leads at the conclusion of the armature winding cycle.

FIGS. 25, 26 AND 27 ILLUSTRATE A MODIFICATION OF THE PREFERRED EMBODIMENT OF THE INVENTION

FIG. 25 is a side view with parts thereof broken away and in section, of the essential elements of a modification of the preferred embodiment of the invention;

FIG. 26 is a view similar to FIG. 25, but illustrating only one of the two wire gripping and cutting mechanisms with which the machine is equipped, and at a larger scale; and FIG. 27 is a detail sectional view taken on the plane of the line 27—27 in FIG. 25.

THE EMBODIMENT OF THE INVENTION DISCLOSED IN APPLICATION SER. NO. 721,805

Figure 1:
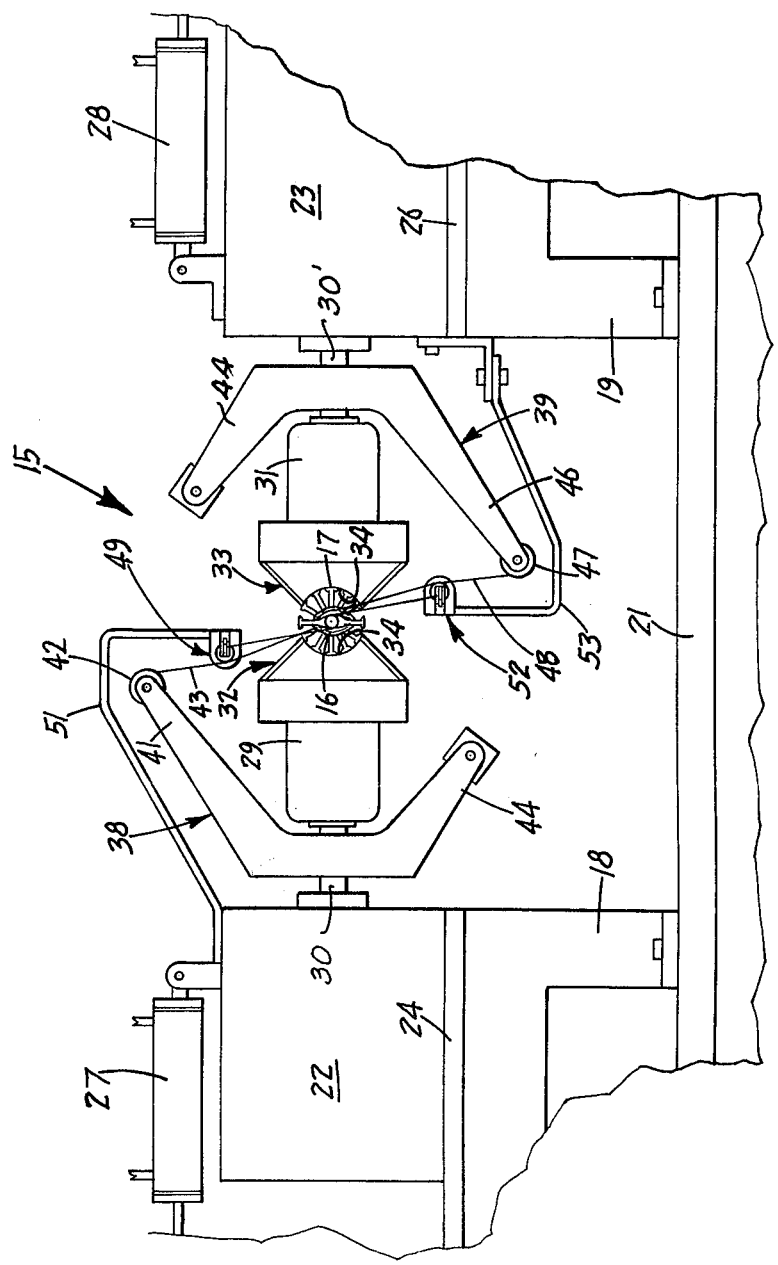

Referring to FIGS. 1 through 11, which illustrate one embodiment of the invention, the numeral 15 designates generally a conventional armature winding machine by which coils of wire 16 are wound onto a core 17, such as a slotted armature rotor of an electric motor, generator or other similar machine. The frame of the machine 15 includes a pair of spaced supports 18 and 19 mounted on a horizontal table 21. Housings or bearing blocks 22 and 23 are mounted on the supports 18 and 19 by horizontal slides 24 and 26 for translatory horizontal movement toward and away from one another. Any suitable means, such as an air cylinder (not shown) may be used to move the housings 22 and 23; and double acting cylinders 27 and 28 secured to the housings 22 and 23, respectively serve to power indexing mechanism (not shown) by which the core is rotated or indexed as required to bring different pairs of core slots into coil receiving positions.

Coaxial shafts 30 and 30' project from the housings 22 and 23 to support horizontal arms 29 and 31 which project toward one another and terminate in chucks or shrouds 32 and 33, respectively. The opposing faces of these chucks or shrouds are shaped to provide the usual arcuate concave recesses 34 which conform to the curvature of the core 17 to grip the same and hold it in position to be wound, with all but four of slots in the core covered.

From the top and bottom edges of the arcuate concave recesses 34 the shrouds have outwardly diverging surfaces 36 and 37 to guide wire into the uncovered slots, as best seen in FIG. 3.

The coil of wire 16 are wound on the core 17 by a pair of conventional rotatable flyers, indicated generally by the numerals 38 and 39, which are fixed to shafts 30 and 30' to be driven thereby in coaxial circular and axially spaced orbits. The flyers are identical and have arms 41 and 46 at the outer ends of which there are pulleys 42 and 47 which provide guides for the wires 43 and 48 being wound onto the core 17. A second weighted arm 44 balances each of the flyers.

Each flyer winds a series of coils on the armature core, and as is customary and shown in FIG. 5, the successive coils are connected by lead wires which are attached to the tangs of the commutator of the armature.

Located between the outer ends of the flyer arms and their respective core gripping chucks or shrouds 32-33 are wire gripping and cutting mechanisms, indicated generally by the numerals 49 and 52. Arms 51 and 53 support the wire gripping and cutting mechanisms from the housings 22 and 23 so that the wire gripping and cutting mechanisms partake of any adjustment of the shrouds 32-33 and the flyers toward and away from the core 17.

As will be seen, the wire gripping and cutting mechanisms 49 and 52 are located in close proximity to the core 17 within the circular orbits of the flyer pulleys, or more accurately, within an imaginary cylinder defined by the orbits. Heretofore, in winding machines equipped with automatic lead cutting means, the mechanism for doing so was most commonly mounted in front of the area between the supports 18 and 19, which is so far removed from the flyers that the length of the wires starting and ending leads forming end of the wound armatures had to be about ten inches long to reach the cutting mechanism. Those wires had to be cut from the wound armatures and constituted waste.

With the embodiment of this invention illustrated in FIGS. 1–11, only about four inches is wasted and in the other embodiments of the invention shown in FIGS. 12–26, it is considerably less. The saving in wire effected by this invention is at least on the order of two feet per core; and with the preferred embodiment of the invention the saving is appreciably more. A busy factory winds thousands of cores per day — hence, the daily saving in wire amounts to several thousand feet.

The wire gripping and cutting mechanisms 49 and 52 are identical in structure and function. Each holds the end of the stretch of wire that leads from the flyer, at the commencement of the winding operation, releases the same at an appropriate time during the winding of the coils, and again grips and cuts it at the completion of the winding operation. The wound core then can be removed from the winding machine. A feature of the wire gripping and cutting means is that the wire is in the grasp of the wire gripping means at the time it is cut and that the cut is made between the wire gripping means and the core. Accordingly, each wire gripping means can, and does, retain its grasp upon the end of the wire leading from the flyer until the winding of the next-to-be-wound armature core is underway.

Though the following description will relate only to the wire gripping and cutting mechanism 49 and its respective flyer 38 and shroud 32, it applies as well to the wire gripping and cutting mechanism 52.

As depicted in FIGS. 6, 7 and 9, the wire gripping and cutting mechanism 49 comprises an elongated body 54 which is fixed to and supported by the arm 51 and has a longitudinally extending bore 56 therein opening to its outer end. A flat bar 57 is secured to the body 54 with an edge portion thereof received in a longitudinal slot 64 in the body that opens into the bore 56. Pins 61 secure the bar to the body with the said one edge portion of the bar projecting into the bore 54 to form a key 62, and with the outer end portion of the bar projecting endwise beyond the body.

The outer projecting end portion of the bar is shaped to provide an upstanding jaw 58 having a square edged face 59 facing the body. The face 59 forms one of the jaws of the wire gripping means and also provides one edge of the wire cutting means. The other jaw of the wire gripping means is provided by the flat end surface 69 of a wire holding member 68 that is endwise slidable along the bar 57, and the other edge of the wire cutting means is the foremost V-shaped edge 66 of a shearing member 63 that is slidably received in the bore 56.

In cross section, the bar 57, the holding member 68 and the shearing member 63 are so related that the edge 66 slides across one side of the bar to have shearing coaction with the adjacent edge of the face 59, and the flat end 69 of the holding member is directly opposed to the face 59 to coact therewith in gripping a wire.

The holding member 68 is reciprocably seated in a groove 67 formed in the outer end portion of the shearing member, which groove opens to the slot 64 and hence is closed by the key forming portion 62 of the bar 57, see FIG. 7. A lost motion connection between the shearing member and the holding member enables both of these parts to be reciprocated in unison while accommodating relative endwise movement therebetween. This lost motion connection is provided by a pin 73 which projects from the holding member into an elongated slot 74 in the shearing member. A spring 71 seated in a well in the inner end of the groove 67 and encircling a pin 72 that projects from the adjacent end of the holding member yieldingly takes up the lost motion in the connection between these parts, and yieldingly maintains the outer end 69 of the holding member forwardly of the knife edge 66, as shown in FIGS. 5 and 6.

The shearing member 63 is reciprocated by an air motor 76 mounted on the rear end of the body 54, with its plunger 77 projecting into the bore 56 and secured to the shearing member. During the initial portion of the forward stroke of the air motor 76, both the shearing member 63 and the holding member 68 move in unison toward the jaw 58. This concomitant advance continues until, as shown in FIG. 8, the outer end 69 of the holding member 68 collides with and clamps the wire lead 43 against the face 59 of the jaw 58. Thereafter, by virtue of the lost motion connection between the shearing member and the holding member, only the shearing member continues its advance and, in doing so, causes its cutting edge 66 to move past the face 59 with a shearing action which cuts the wire. FIG. 9 illustrates the parts in the positions they occupy after the wire has been cut.

Attention is directed to the fact that, as best shown in FIG. 5, the knife edge 66 of the shearing member slides across the side of the bar 57 which faces the armature core. Hence, the cut — when made — is located between the wire gripping means and the armature core, permitting the wound core to be removed without disturbing the grasp of the wire gripping means on the end of the stretch of wire coming from the flyer. To assure the maintenance of a secure grip on the wire, the end 78 of the shearing member abuts against the adjacent end of the holding member to provide a positive force applying connection between the air motor and the wire holding member.

To better position the stretches of wire leading from the flyers, with respect to the next core to be wound, a wire holder — indicated generally by the numeral 79 — is mounted on the forward end of each of the wire gripping and cutting mechanisms 49 and 52. Each of these holders comprises a pair of forwardly projecting divergent fingers 81 and 82, with a recess 83 at their junction to receive the wire lead 43. The diverging fingers 81 and 82, as shown in FIGS. 5 and 10, have a transverse slot 84 in which a latch 85 is located and pivotally mounted by a pin 87. The front edge of the latch is stepped, as at 86, to coact with the recess 83 in confining a wire, and — as shown in FIG. 10 — a spring 88 in a bore or well 89 biases the latch 85 towards its closed position.

In operation, and considering only the winding done by the flyer 38, the end of the stretch of wire 43 coming from the flyer is anchored, as shown in FIG. 2, by being placed in the grasp of the wire gripping and cutting mechanism 49. The housing 22 is then moved toward the core 17 to position the shroud 32 adjacent to the side of the core 17, as shown in FIG. 3, and to also dispose the flyer 38 and the wire gripping and cutting mechanism 49 in their operative positions relative to the core 17. Upon initial movement of the flyer arm 41, the wire 43 is carried over the end of the holder 79 and falls into the recess 83 to be retained therein by the latch 85. The recess 83 allows the wire to move linearly while holding the same where it does not interfere with the winding of the coil 16 onto the core 17, as shown in FIG. 3.

It is, of course, understood that during the winding of an armature core, each flyer winds a series of coils into paired angularly spaced slots in the core, and that between the winding of successive coils, the core is indexed to bring another pair of slots into coil receiving position, and the leads connecting the successive coils are attached to the tangs of the commutator of the armature.

Figure 4:
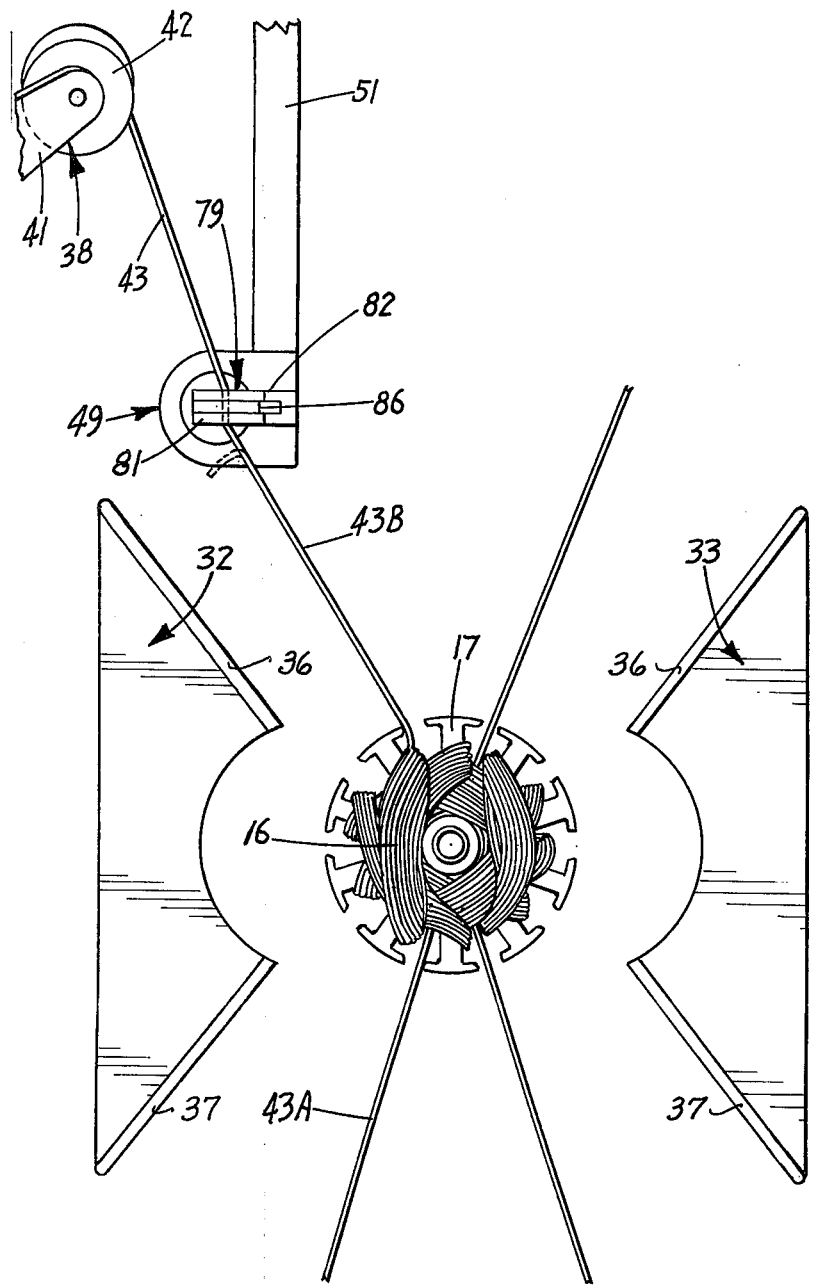

After all of the slots in the armature 17 have had coils 16 wound therein, the holding member 68 and the shearing member are retracted to allow the stretch of wire 43B coming from the last coil wound by the flyer 38 to drop into the space between the jaw face 59 and the face 69 of the holding member, so that upon actuation of the air motor 76, the stretch of wire 43B will be clamped between the faces 59 and 69, as shown in FIGS. 4 and 8, and — immediately thereafter — the air motor moves the shearing member 63 forward far enough to carry its knife edge 66 beyond the face 59, whereupon that stretch of wire 43B is cut at that side of the wire gripper which faces the armature core.

Since the shearing member remains in its projected position after the cut is made, it covers the notch or space between the jaw 58 and the front end 69 of the holding member, and thus keeps the wire being wound onto the next core from catching on any part of the wire gripping and cutting mechanism. Obviously, though, at the completion of the winding operation, the air motor 76 is automatically actuated to retract the shearing member and, with it, the wire holding member to enable the wire to drop into the space between the faces 59 and 69 preparatory to being gripped and cut.

THE PREFERRED EMBODIMENT OF THE INVENTION FIGS. 12 – 23

In the embodiment of the invention just described, and which constitutes the subject matter of the parent application, Ser. No. 721,805, the desired reduction in length of the wire wasted is achieved by having the wire gripping and cutting mechanisms located within the orbit of the rotating flyers, so that the wound armature core need not be moved from between the chucks 32 and 33 until the wires are cut. In the preferred embodiment of the invention, an even greater reduction in the length of wire wasted is made possible by locating the wire gripping and cutting mechanisms between the planes defined by the orbits of the two rotating flyers, and in close proximity to the circle of commutator tangs of an armature core in winding receiving position, which of course places them within an imaginary cylinder defined by the orbits of the flyers.

As will be explained hereinafter, the only wire wasted in winding an armature on a machine equipped with the preferred embodiment of the invention, is a piece not much longer than one inch; but, more important, with this embodiment of the invention the starting lead — as well as the ending lead — is cut from the stretch of wire of which it is formed so close to the commutator tang to which it is attached that no need exists for trimming off any wire after the wound armature is removed from the machine.

With particular reference to FIG. 12, it will be seen that the machine in the preferred embodiment of the invention also has a pair of flyers 100 opposing one another and mounted for rotation about a common axis that intersects and is normal to the axis of an armature core AC in position to be wound. Also, as in the previously described embodiment of the invention, the slotted armature core is embraced by a pair of shrouds 101 during the winding operation, which shrouds cover all but the two pairs of angularly spaced core slots into which the rotating flyers are to wind coils. And, to guide the wire into these paired slots, the shrouds 101 have guide wings 102 which function in the conventional manner to guide the stretches of wire being wound onto the core into the proper slots.

In this machine, the armature core — though embraced by the shrouds 101 — is held in position to be wound by core gripping means 103 (FIG. 13) which forms part of a combined core gripping, core rotating and commutator shielding unit, indicated generally by the numeral 104. This unit projects forwardly from a stationary part 105 of the machine frame.

The core gripping means is a conventional collet by which one end portion of the armature core shaft is gripped after the core has been manually placed in position. This collet consists of an outer tubular element 106 with a tapered socket in its outer end in which the jaws 107 of the collet are received, the latter being provided by the taperingly enlarged outer split end of an inner tubular collet element 108. Hence, upon insertion of the armature core shaft into the mouth of the collet jaws and rearward displacement of the inner collet member 108, the armature core is tightly gripped by the collet. A rod 109 threaded into the inner collet member provides for actuation of the collet. The manner in which the collet rod 109 is reciprocated forms no part of this invention and hence is not illustrated in FIG. 13, though in FIG. 25 — which is one of the views illustrating a modification of the preferred embodiment of the invention — the collet rod 109 is shown connected through a rotation accommodating coupling 110, with the piston 111 of an air cylinder 112. Obviously, by controlling the admission of air pressure to the cylinder, the collet can be actuated to grip and release an armature core.

Figure 25:
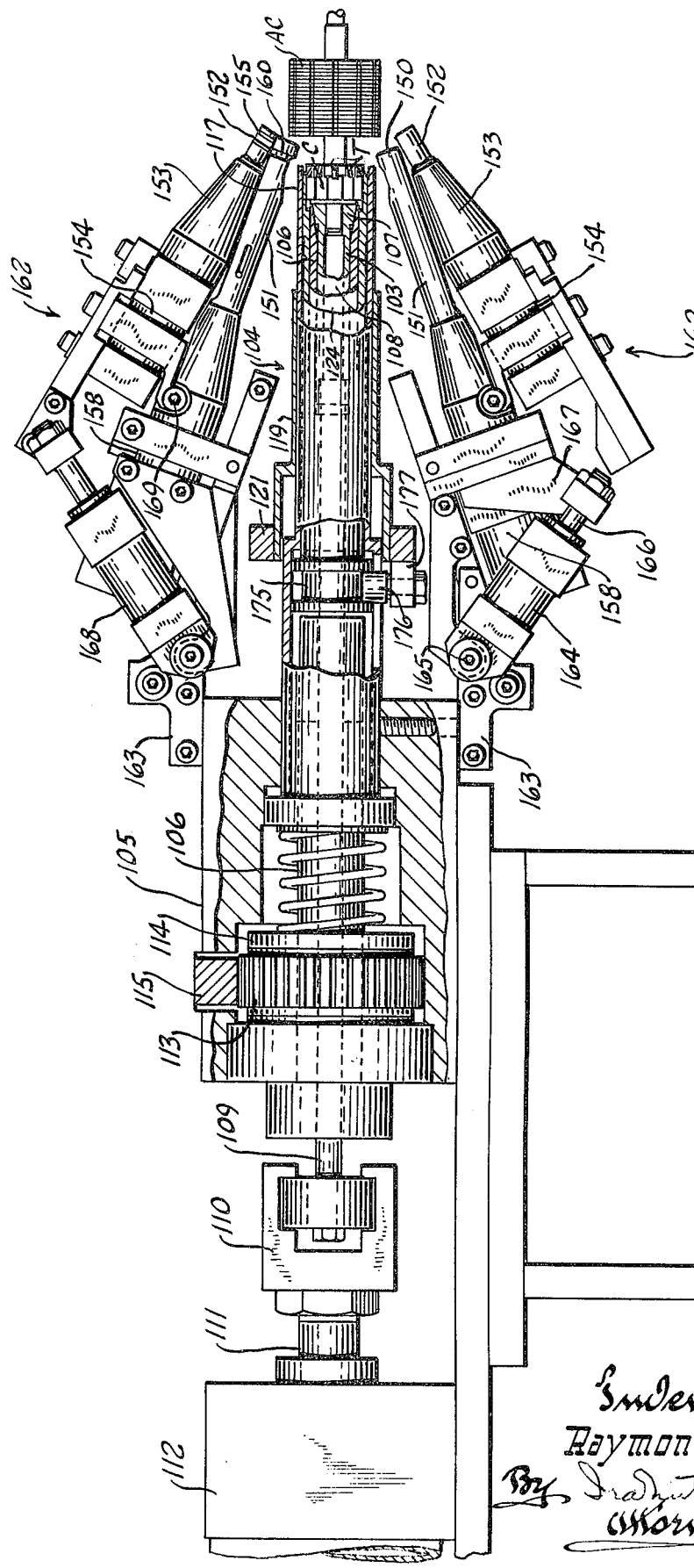

FIG. 25 also illustrates the structure by which armature core indexing rotation is imparted to the core gripping means, i.e. the collet. For this purpose, a gear 113 is mounted on the outer tubular element 106 of the collet and drivingly connectible thereto through a unidirectional clutch, indicated by the numeral 114, so that rotation of the gear 113 by reciprocation of a rack 115 in one direction, imparts rotation to the collet while — during movement of the rack in the opposite direction — the collet is held against turning. In this manner, indexing rotation is imparted to an armature core in the grasp of the collet. The means for reciprocating the rack to effect indexing of the core forms no part of this invention and can be of any conventional type; hence, it has not been illustrated.

Returning to the description of the preferred embodiment of the invention, and with specific reference to FIG. 13, the coacting elements of the collet are inside and coaxial with a tube 116 which extends forwardly from and is fixed to the frame part 105. The outer end portion of this tube has its inside diameter increased to provide a thimble 117 which receives the hook-like tangs T of the commutator C of an armature core gripped by the collet. Although the lengthwise position of the tube 116 must be adjustable to assure its outer end being properly positioned with respect to a particular size armature core, it has no movement — either axial or rotatable — in the performance of its function.

As best seen in FIGS. 16, 17, 22 and 23, the thimble 117 has diametrically opposite notches 118 opening to its end to expose two diametrically opposite commutator tangs when a tubular shield 119 encircling the tube 116 is retracted from its operative shielding position in which the open ends of the tube 116 and the shield are coterminous, as in FIGS. 15, 18, 20, 21 and 24.

The tubular shield 119 is axially slidable on the tube 116 but not rotatable. Its rear end is enlarged to fit the adjacent end portion of the tube 116 which is also enlarged to provide a cylinder 120 for a purpose to be described. A collar 121 fixed to the enlarged rear end of the tubular shield has the plunger 122 of an air cylinder 123 fixed thereto, so that by actuation of the air cylinder, the tubular shield may be projected to its operative position covering the notches 118 in the thimble and retracted to uncover the notches and expose two diametrically opposite commutator tangs.

Between the outermost tubular element 106 of the collet and the tube 116 is a tubular lead retaining member 124, the front end portion of which receives the commutator of an armature core gripped by the collet. The extreme front end of the lead retaining member is tapered so as to enter the hook-like tangs T upon outward projection thereof, and in so doing holds leads that have been attached to tangs against becoming detached. FIG. 14 illustrates the function of the retaining member. The retaining member is projected to its operative position by pressure fluid in the cylinder 120, and is retracted by a spring 125.

Not only does the tubular shield 119 coact with the thimble 117 to control exposure of the commutator tangs for the attachment of wire leads thereto, but also to sever the starting and ending leads of the armature winding from the stretch of wire of which they were formed, at the start and conclusion of the winding operation. For this purpose, the shield has two diametrically opposite hooks 126 projecting from its outer end to protrude beyond the end of the thimble when the shield is in its projected operative position. Each hook has a notch 127 in one side thereof to receive the lead to be cut, so that upon retraction of the shield, sharp inner edges of the notches coact with the circular edge formed by the junction of the end surface of the thimble with its cylindrical outer boundary, to effect a shearing action by which the wires are cut. The manner in which the wires are engaged in the notches 127 will be described later.

At this point it should be observed that the hooks 126 lie in a vertical plane containing the axis of an armature core in position to be wound, and hence are equispaced from the planes defined by the orbits of the flyers, whereas the notches 118 in the thimble lie in a horizontal plane that also contains the armature core axis. The presence of the hooks 126, therefore, does not interfere with the winding of the coils, since the stretches of wire extending from the flyers to the core simply slide along the opposite sides of the tubular shield.

The wire grripping means in the preferred embodiment of the invention comprises a pair of tubular fingers 130, mounted above and beneath the combined core gripping, core rotating and commutator shielding unit 104. The mounting of each finger 130 includes a stationary bracket 131 fixed to and projecting from the frame part 105 and an air cylinder 132 pivoted, as at 133, to the bracket. The finger 130 is fixed to and projects from the air cylinder so that by swinging the cylinder about its pivotal connection with the bracket, the outer free end of the finger can be moved towards and from the axis of an armature core in position to be wound. Such swinging movement is produced by an actuating cylinder 134 connected between the bracket and the cylinder 132.

In FIG. 12, the fingers 130 are at the outermost extremities of their range of swinging motion; in their innermost positions the ends of the fingers are directly adjacent to the top and bottom of the outer end portion of the tubular shield, as shown in FIGS. 15–18.

Each finger 130 has a notch 135 in the side thereof facing the orbit of its respective flyer, to receive a wire to be gripped. The axially inwardly facing side 136 of this notch coacts with the flat end 137 of a plunger 138 that is reciprocable in the tubular finger to grip a wire received in the notch. The plunger is connected to the piston of the cylinder 132 so that by the control of air pressure into the opposite ends of the cylinder 132, the plunger can be projected to grip a wire and retracted to release the wire.

Briefly considering the procedure involved in beginning the winding of an armatue and in terminating the winding operation, and confining the description to only one of the two flyers, reference is first made to FIGS. 15–18. As shown in FIG. 15, an armature core is in position in the machine in place of one that had just been wound and removed from the machine. The end of the stretch of wire coming from the flyer 100 is in the grasp of the wire gripping finger 130 which is in its innermost position contiguous to the adjacent hook 126 on the tubular shield. The wire is in the grasp of the gripping finger as a result of the conclusion of the preceding winding operation and hence a tiny stub of wire projects from the gripping finger. The tubular shield is in its projected operative position.

The flyer is rotated in its winding direction, designated by the arrow W in FIG. 15, to carry the stretch of wire to its position shown in FIG. 16, at which time the shield is retracted to expose one of the commutator tangs and the tubular retaining member 124 is retracted to afford access to the exposed tang. The flyer is now rotated in the reverse direction and, as a result, the wire hooks,itself onto the exposed tang, as shown in FIG. 17.

Attention is directed to the fact that the tang onto which the wire has hooked itself is spaced a distance from the gripper finger 130 and especially from its grasp on the end of the wire. As will be later described, it is this distance that defines the length of wire that will be wasted.

After the condition shown in FIG. 17 is reached, the tubular shield is advanced to its operative position covering all of the tangs and the lead retaining member 124 is projected to its operative position to hold the wire against detachment from the tang onto which it hooked itself.

With the shield covering the tangs, the flyer is again rotated in the winding direction towards its position shown in FIG. 18, and during this interval the wire wraps itself around the tang and forms the desired alpha-type attachment shown in FIG. 19.

The next event in the sequence takes place while the flyer is at rest in its position shown in FIG. 18. It consists of imparting rotation to the armature core (in the clockwise direction in FIG. 18) by means of the collet gripping its shaft. Such rotation carries the core towards the position it is to occupy during the winding of the first coil. As the core is rotated, the tang to which the wire is attached moves towards the bottom one of the two hooks 126 and the gripper finger 130 moves downward to keep tension on the short stretch of wire which extends from the finger to the tang. The net result of these motions is entry of this stretch of wire into the notch 127 of the hook (as shown in FIG. 20) in preparation for severance of the starting lead from the wire in the grasp of the gripper finger 130, by retraction of the shield. This severance of the starting lead from the wire of which it was formed and which is being held by the gripper finger in nowise affects the attachment of the starting lead to the tang since, at this time, and until the winding of the first coil is well along, the lead retaining member 124 securely holds the alpha-type attachment of the wire to the tang.

Since the cut is made at the edge of the thimble 117 (FIG. 14) the stub of wire which is left protruding from the tang is very short and needs no further trimming. Also, the length of wire left in the grasp of the gripper finger 130 is relatively short, being only as long as the arcuate distance the tang travels during approximately 90° of rotation of the core, plus the length of wire in the grasp of the gripper finger. That short piece of wire is all that is wasted, but it is retained in the grasp of the gripper finger until the winding operation is finished, to preclude its becoming entangled with the wire being wound onto the core.

Directly after the starting lead is severed from the piece of wire held by the gripper finger, the indexing rotation of the core is resumed and, since the cutting takes but a fraction of a second, it may be said that the cutting occurs during a momentary interruption of the indexing rotation.

Preferably, as already indicated, the retaining member 124 remains in its operative projected position until the winding of the first coil is well along, at which time the member 124 is retracted to remain inoperative and unneeded until the starting sequence of the next to be wound armature core takes place.

FIGS. 21-24 illustrate different stages in the termination of the ending lead. In FIG. 21, the winding of the last coil has been completed and the flyer is stopped with the stretch of wire leading from it to the core extending tangentially across one side of the armature shaft and across the end of the thimble 117 and the tubular shield 119. The gripper finger 130 with the short piece of wire that will be wasted in its grasp, occupies its position farthest from the tubular shield — that is, its lowermost position. It will remain in that position and retain its grasp upon the short piece of wasted wire until just before the ending lead is to be severed from the stretch of wire leading from the flyer.

In FIG. 22, the shield is retracted to expose the commutator tang then opposite the notch 118 in the thimble. Now clockwise rotation is imparted to the core and, by this rotation, the selected commutator tang is brought into line with the notch 118 so that, upon reverse rotation of the flyer, the wire hooks itself onto the selected tang, as shown in FIG. 23.

The shield is now advanced to cover the tangs and bring the wire cutting hook 126 into its potentially operative position, and the gripper finger 130 is actuated to bring the same to its position contiguous to the hook 126, and opened to drop the piece of wire it had been holding. Since both the notch 127 in the hook and the notch 135 in the gripper finger 130 face in the same direction — namely, towards the orbit of the flyer — and since the plunger 138 of the gripper finger is retracted, further rotation of the core (in the clockwise direction) carries the stretch of wire leading from the flyer to the core into the notch 127 of the hook and also into the notch 135 in the free end of the finger 130.

With the flyer stationary, the plunger in the finger 130 is projected to grip the wire that is now in the notch of the finger, and then — with the wire gripped — the shield is retracted to sever the wire very close to the tang from which it extends. The wound armature core can now be taken from the machine, to be replaced by the next core to be wound.

THE MODIFICATION OF THE PREFERRED EMBODIMENT FIGS. 25 – 27

The main difference between the preferred embodiment of the invention and the modification thereof illustrated in FIGS. 24, 26 and 27, is in the location of the wire cutting means. Instead of embodying the cutting means in the core gripping, core rotating and commutator shielding unit 104, the wire cutting means 150 of the modified embodiment is at the outer free end of a tubular finger 151 and hence is generally similar in construction and design to the wire gripping means of the preferred embodiment. The wire gripping means 152 of the modification is at the outer end of a tubular finger 153 projecting from an air cylinder 154. This finger has a notch 155 in one side of its outer free end portion, and a plunger 156 slidable in the finger coacts with the side of the notch nearest the outer extremity of the finger to grip a wire engaged in the notch, as in the preferred embodiment of the invention and as shown in FIG. 15A.

The wire cutting means 150 comprises a tubular finger 157 projecting from an air cylinder 158 and a plunger 159 slidable in the finger. The finger has a notch 160 in one side thereof near its outer extremity; but, in this case, the end 161 of the plunger not only enters the notch 160 but moves all the way across the notch and into a socket in the far side of the notch. Thus a wire received in the notch will be sheared, and to facilitate the shearing action the end 161 of the plunger is beveled, as shown in FIG. 27.

The two tubular fingers 152 and 157 and the air cylinders 154 and 158 from which they project are connected into a unitary assembly, identified generally by the numeral 162 which is pivotally connected to a pair of arms 163 that project from and are fixed to the frame 105. Hence the assembly 162 may be swung towards and from the axis of an armature core in position to be wound, to facilitate insertion and removal of armature cores. A cylinder 164 supported as at 165 with its plunger 166 connected to a frame 167 to which the cylinder 158 of the cutter finger is secured, provides the means for swinging the assembly towards and from the armature core axis.

As shown in FIG. 25, the assembly 162 is duplicated (one for each flyer) above and below the combined core gripping, core rotating and commutator shielding unit 104, and since the assemblies are duplicates of one another and the actuating cylinder 164 is at the near side in the lower assembly, in the upper assembly it is directly behind a cylinder 168 and hence not visible. The cylinder 168 provides means for swinging the gripper finger 153 outwardly from its position shown in FIG. 26, and it is by such outward swinging movement of the gripper finger that the wire lead in its grasp can be drawn taut before it is cut.

The pivot about which the gripper finger 153 swings is indicated by the numeral 169 in FIG. 26. Also illustrated in this view is the fact that the plungers operating in the tubular wire gripping and wire cutting fingers are retracted by springs. For the wire gripping finger, the spring 170 is located near the outer end of the finger; and for the wire cutting finger, the spring 171 is located directly adjacent to the pivot 169 about which the finger swings. Outward projection of the plungers is effected by the associated cylinders 154 and 158.

To assure proper orientation of the beveled end 161 of the wire cutting plunger with respect to the wire in the notch 160, the plunger is restrained against rotation by a pin 172 extending diametrically across the tubular finger and through a slot 173 in the plunger.

The manner in which the wire gripping and cutting functions are performed in this modified embodiment of the invention is no doubt obvious from the foregoing description, but to assure completeness of the disclosure — at the completion of the winding operation the wire gripping finger closely overlies the wire cutting finger and their respective notches 155 and 160 are in line, as shown in FIG. 25. The plungers of both fingers are retracted. The stretch of wire which extends from the flyer to the commutator tang about which it had been wrapped is then caused to enter the notches 155 and 160 by appropriate rotation of the armature core. The air cylinder 154 of the wire gripping finger is activated to project its plunger 156 and thereby grip the wire.

The retracted plunger 159 of the wire cutting means is then projected by activation of its air cylinder 158, whereupon the wire is severed very close to the tang from which it extends.

Although not illustrated, the modified embodiment of the invention employs the same general procedure at the start of the winding operation as that followed in the preferred embodiment. Thus, at the very beginning of the winding operation, each gripper finger 153 is contiguous to its respective cutter finger 157 and holds the end of the wire coming from the flyer. After attachment of the wire to a commutator tang, the armature core is rotated to cause the wire coming from the tang to enter the notch in the cutter finger and, during that rotation, the gripper finger is swung away from the cutter finger to take up the slack in the wire which would otherwise result from rotation of the core; and then the plunger in the cutter finger is projected to sever the wire.

As in the preferred embodiment of the invention, the modification thereof also has a tubular lead retaining member 124 to enter the hook-shaped tangs and hold the leads in place. But, in this case, endwise motion of the retaining member to and from its operative position is produced by coupling the same to the tubular shield so that when the shield is projected to its position covering the commutator tangs, the retaining member is also moved to its operative position. The coupling between the shield and the retaining member comprises an annular groove 175 in the inner end of the retaining member and a roller 176 riding in the groove and mounted on the outer end of an arm 177 projecting from the adjacent rear end of the shield. The shield and the retaining member thus can be axially moved in unison while leaving the retaining member free to turn with the collet during indexing of the armature core.

To the extent that the preferred embodiment of the invention and its modification have common structure, the same reference numerals apply to both.

Those skilled in the art will appreciate that the invention can be embodied in forms other than as herein disclosed for purposes of illustration.

The invention is defined by the following claims:

1. In an armature winding machine for winding a continuous length of wire into a series of connected coils onto the slotted cores of armature core assemblies, each of which includes in addition to the slotted core a commutator with tangs on its circumferentially spaced bars with the wire forming the ending lead of one coil continuing uninterruptedly to form the starting lead of another coil and with said uninterrupted leads as well as the starting lead and ending lead of the entire series of coils attached to tangs of the commutator, the combination of:

A. core gripping means to hold an armature core assembly in winding receiving position;
   B. a rotatable flyer to draw wire from a source thereof and wind it into a series of connected coils onto the slotted core of an armature core assembly in the grasp of said core gripping means with the leads connecting successive coils unbroken and attached to the commutator tangs;
   C. mounting means for said rotatable flyer by which the same is constrained to rotation about an axis transversely intersecting an armature core assembly in the grasp of said core gripping means;
   D. means to sever the stretch of wire leading from the flyer to an armature core assembly in the grasp of said core gripping means, said last named means comprising
      1. wire gripping means operable to grip said stretch of wire,
      2. wire cutting means operable to sever said stretch of wire, said wire cutting means comprising
         a. a knife element having a cutting edge, and
         b. mounting means for said knife element so disposed with respect to the wire gripping means that the cutting edge of the knife element is transverse to the wire extending from the wire gripping means to the armature core assembly in the grasp of said core gripping means, to sever the same at a point between the wire gripping means and the armature core assembly;
      3. mounting means for said wire gripping means and for said wire cutting means, so disposed with respect to the axis about which the flyer rotates that at the time the wire cutting means severs the wire, the wire cutting means is no farther from the axis about which the flyer rotates than the circular orbit defined by the flyer; and
      4. means for actuating the wire gripping means and the wire cutting means to effect severance of the wire while the wire gripping means has the wire in its grip; and
   E. means for so timing the operation of the wire gripping means and the wire cutting means with respect to one another and the operation of the flyer that the wire gripping means grips said stretch of wire only upon cessation of wire winding rotation of the flyer at the completion of the armature being wound, and retains its grip thereon after the cutting means has severed the same and until the wound armature has been removed and replaced by an unwound armature core assembly and the winding thereof by the rotating flyer is begun.

2. In a coil winding machine, the structure set forth in claim 1, wherein the core gripping means comprises a pair of relatively movable chucks between which the core is clamped, wherein there are two flyers and two wire gripping means and wire cutting means, one set thereof for each chuck, and wherein each such set bears a fixed spacial relationship to its respective chuck.

3. The coil winding machine of claim 2, further characterized by a slidably mounted carrier for each chuck, the flyers being rotatably mounted on said carriers for rotation about a common axis, and means mounting a wire gripping means and a wire cutting means on each carrier with the two sets thereof at diametrically opposite sides of the common axis about which the flyers rotate and within the orbits thereof.

4. In an armature winding machine, the combination defined by claim 1, further characterized in that the means by which the wire gripping means and the wire cutting means are mounted are so disposed with respect to the axis about which the flyer rotates that both the wire gripping means and the wire cutting means are within the circular orbit of the flyer.

5. In an armature winding machine, the combination defined by claim 1, further characterized in that the knife element is movably carried by said mounting means and constrained thereby to movement along a path that is substantially parallel with the axis of an armature core assembly in the grasp of the core gripping means.

6. The coil winding machine of claim 5 wherein the wire gripping means comprises cooperating fixed and movable jaws, the former being fixed with respect to said common mounting structure and the latter being movably mounted thereon for movement towards and from the fixed jaw, and wherein the cutting edge of the movable knife element coacts with the fixed jaw to shear a wire gripped between the jaws.

7. The coil winding machine of claim 6, further characterized by 1. means providing a lost motion connection between the movable jaw and the movable knife element,
2. wherein said means for actuating the wire cutting means comprises power means connected with the movable knife element to move it towards the fixed jaw, and
3. spring means reacting between the movable jaw and the movable knife element to yieldingly take up the lost motion in the connection therebetween, and to yieldingly project the movable jaw beyond the cutting edge of the movable knife element so that during movement of the movable knife element towards the stationary jaw the movable jaw travels ahead of the cutting edge of the movable knife element, whereby the jaws are brought into wire gripping coaction before the cutting edge of the movable knife element begins its shearing coaction with the stationary jaw.

8. The coil winding machine of claim 6, further characterized by wire holding means supported on said common mounting structure and positioned outwardly of the fixed jaw to engage the stretch of wire extending from the end thereof gripped by the jaws of the wire gripping means and leading to the flyer to position the same relative to the armature core being wound.

9. The coil winding machine of claim 8, wherein said wire holding means comprises an arm projecting from said common mounting structure, and divergent fingers on the outer end of the arm between which the wire is received.

10. The coil winding machine of claim 9, further characterized by latch means extending across said fingers to hold a wire received therebetween against any but endwise displacement therefrom, said latch means being yieldable in the direction to enable lateral entry of a wire between the fingers.

11. In an armature winding machine, the combination defined by claim 5, further characterized in that the path to which said mounting means for the movable knife element constrains its movement is so disposed that the knife element is at all times between the wire gripping means and an armature core assembly in the grasp of the core gripping means.

12. The coil winding machine of claim 1, wherein there are two flyers rotatable about a common axis and the planes defined by their orbits are spaced apart along said axis, wherein there are two pairs of wire gripping means and wire cutting means, one pair for each flyer, and wherein said two pairs of wire gripping means and wire cutting means are located between said planes.

13. The coil winding machine of claim 12, wherein the axis about which the flyer rotates intersects the axis of an armature core assembly in the grasp of said core gripping means, and wherein one pair of said wire gripping means and wire cutting means is at one side of a plane containing said intersecting axes and the other pair thereof is at the opposite side of said plane.

14. In a coil winding machine, the combination set forth in claim 1, wherein said means by which the wire gripping means is mounted and the means by which the wire cutting means is positioned have a common mounting structure by which said two means are located in the machine and maintained in cooperative relation with one another and with the flyer.

15. A coil winding machine for winding a continuous length of wire into a series of connected coils onto the slotted cores of armature core assemblies and attaching the beginning and end of each coil as well as the starting and ending leads of the entire series of coils to tangs of commutators forming part of the armature core assemblies, with the wire forming the ending lead of one coil continuing uninterruptedly to form the starting lead of another coil, the tangs being arranged in a circle concentric to the core axis, said machine having 1. core gripping and indexing means operable to grip and hold an armature core assembly with a pair of angularly spaced slots of its core in coil receiving position to have a coil wound therein and to index the same to successively bring other pairs of slots into said position;
2. a flyer rotatable about an axis substantially intersecting and normal to the axis of an armature core assembly held by said core gripping means, and operable to wind wire drawn from a source thereof into the pair of armature core slots in coil receiving position,
the flyer being constrained to travel in a fixed circular orbit during the winding operation and the wire being wound into said armature core slots having a stretch thereof which leads from the flyer to the core during the winding of each coil and from the flyer to a commutator tang in the intervals between the winding of successive coils; and 3. means to effect attachment of the uninterruptedly connected leads which extend to and from the successively wound coils to selected ones of the circumferentially spaced commutator tangs without severing said connected leads, and said machine being characterized by:

A. wire cutting means;
B. means mounting said wire cutting means for disposition adjacent to the circle of commutator tangs of an armature core assembly while said assembly is being held in its coil receiving position by said core gripping means;
C. means for effecting relative motion between the wire cutting means and a selected commutator tang to which said stretch of wire leading from the flyer is attached to bring said wire cutting means and said tang into juxtaposition while the armature core assembly is still in its coil receiving position;
D. wire gripping means;
E. means mounting said wire gripping means adjacent to the wire cutting means and outwardly thereof with respect to the axis of an armature core assembly held by said core gripping means;
F. means for actuating said wire gripping means in timed relation to the coil winding rotation of the flyer to cause it to grip said stretch of wire leading from the flyer to the commutator tang to which is attached the ending lead of the last coil wound by the flyer;
G. means whereby said actuating means for the wire gripping means causes the wire gripping means to hold said stretch of wire in position to be cut and to retain its grip on said stretch after severance of the wire so that the wire gripping means holds the end of the stretch of wire extending from the flyer in preparation for the winding of the next succeeding armature core assembly; and
H. means for actuating said wire cutting means to cause it to cut said stretch of wire in the grip of the wire gripping means at a point between it and the commutator tang to which is attached the ending lead of the last coil wound by the flyer.

16. The coil winding machine of claim 15, wherein said wire gripping means comprises:

1. a tubular finger having a laterally opening notch in its free end in which the wire is received preparatory to being gripped; and
2. a plunger axially slidable in said tubular finger with one end thereof projectable into said notch through one side thereof to clamp the wire against the opposite side of the notch.

17. The coil winding machine of claim 16, further characterized in that said tubular finger is mounted to swing about an axis transverse to that of an armature core held by the core gripping means, between a wire gripping position adjacent to the wire cutting means and a wire tensioning position spaced outwardly from the wire cutting means.

18. The coil winding machine of claim 15, wherein said wire gripping means and wire cutting means comprises:

A. an assembly consisting of 1. a pair of tubular fingers each having a laterally opening notch in its free end to receive the stretch of wire to be gripped and cut, and
2. a plunger reciprocable in each tubular finger, with one end thereof projectable into the notch in the tubular finger, one of said tubular fingers constituting part of the wire cutting means, and the plunger therein having a shearing edge on its said end to coact with one side of its respective notch to sever a wire received in the notch, and the other tubular finger constituting part of the wire gripping means, and the plunger therein coacting with one side of its respective notch to grip a wire received in the notch; and B. means mounting said assembly with the notched free ends of both tubular fingers positioned to be adjacent to the circle of commutator tangs on the commutator of an armature core assembly in the grasp of the core gripping means, with the finger that constitutes part of the wire cutting means between the nearest commutator tang and the finger that constitutes part of the wire gripping means.

19. The structure set forth in claim 18, wherein said finger that constitutes part of the wire gripping means is movable away from the other finger;

and means for imparting such motion to said finger.

20. The coil winding machine of claim 15, wherein said wire cutting means is restrained against rotation about the axis of an armature core assembly held by the core gripping means, and wherein said means for effecting relative motion between the wire cutting means and said selected tang comprises means for imparting rotation to said core gripping means whereby said relative motion is accomplished by rotating the armature core assembly.

21. The coil winding machine of claim 20, further characterized by means requiring the selected tang to which a lead is to be attached to occupy a predetermined position circumferentially spaced from the tang nearest the wire cutting means, so that the attachment to a selected tang of the stretch of wire which extends from the wire gripping means to the flyer at the start of a winding operation must take place at a distance from the wire cutting means and the wire gripping means, which results in an unusable length of wire extending from the wire gripping means to said tang, and further characterized by means for moving the wire gripping means in the direction away from the axis of the armature core to maintain said unusable length of wire taut as the armature core assembly is rotated to bring the tang to which it is attached into juxtaposition to the wire cutting means in preparation for cutting said unusable length of wire close to the tang to which it is attached.

22. The coil winding machine of claim 21, wherein said means requiring the selected tang to occupy a predetermined position comprises:

tubular shielding means to receive the commutator of an armature core held by said core gripping means, said tubular shielding means having relatively movable elements which cooperate to expose a selected commutator tang at the completion of each coil wound by the flyer;

and further characterized in that said wire cutting means comprises cooperating shearing edges on said tubular shielding means.

23. The coil winding machine of claim 22, wherein said relatively movable elements of the tubular shielding means comprise inner and outer telescoped tubes, each having an open end,
    said tubes being axially shiftable relative to one another to and from a position in which their open ends are contiguous,
and wherein said cooperating shearing edges which comprise the wire cutting means are at the open ends of said tubes to coact in performing a shearing function upon relative axial shifting of said tubes in one direction.

24. The coil winding machine of claim 23, wherein one of said cooperating shearing edges is the edge defined by the junction of the open end of the inner one of said tubes with its outer cylindrical surface, and the other shearing edge is formed by a hook projecting axially from the open end of the outer one of said tubes.

25. In an armature winding machine for winding a continuous length of wire into a series of connected coils onto the slotted cores of armature core assemblies, each of which includes in addition to the slotted core a commutator with tangs on its circumferentially spaced bars with the wire forming the ending lead of one coil continuing uninterruptedly to form the starting lead of another coil and with said uninterrupted leads as well as the starting lead and ending lead of the entire series of coils attached to tangs of the commutator, the combination of:
  A. core gripping means to hold an armature core assembly in winding receiving position;
  B. a rotatable flyer to draw wire from a source thereof and wind it into a series of connected coils onto the slotted core of an armature core assembly in the grasp of said core gripping means with the leads connecting successive coils unbroken and attached to the commutator tangs;
  C. mounting means for said rotatable flyer by which the same is constrained to rotation about an axis transversely intersecting an armature core assembly in the grasp of said core gripping means;
  D. means to sever the stretch of wire leading from the flyer to an armature core assembly in the grasp of said core gripping means, said last named means comprising
    1. wire gripping means operable to grip said stretch of wire,
    2. wire cutting means operable to sever said stretch of wire, said wire cutting means comprising
      a. a movable knife element having a cutting edge, and
      b. mounting means for said movable knife element guiding and constraining the same to movement along a path that is substantially parallel with the axis of an armature in the grasp of the core gripping means and so disposed with respect to the wire gripping means that the cutting edge of the movable knife element is transverse to the wire extending from the wire gripping means to the armature core assembly to sever the same upon advance of the knife element at a point between the wire gripping means and the armature core assembly;
    3. mounting means for said wire gripping means and for said wire cutting means, so disposed with respect to the axis about which the flyer rotates that at the time the wire cutting means severs the wire, the wire cutting means is no farther from the axis about which the flyer rotates than the circular orbit defined by the flyer; and
    4. means for actuating the wire gripping means and the wire cutting means in timed relation to one another to effect severance of the wire while the wire gripping means has the wire in its grip.

26. In an armature winding machine for winding a continuous length of wire into a series of connected coils onto the slotted cores of armature core assemblies, each of which includes in addition to the slotted core a commutator with tangs on its circumferentially spaced bars with the wire forming the ending lead of one coil continuing uninterruptedly to form the starting lead of another coil and with said uninterrupted leads as well as the starting lead and ending lead of the entire series of coils attached to tangs of the commutator, the combination of:
  A. core gripping means to hold an armature core assembly in winding receiving position;
  B. a rotatable flyer to draw wire from a source thereof and wind it into a series of connected coils onto the slotted core of an armature core assembly in the grasp of said core gripping means with the leads connecting successive coils unbroken and attached to the commutator tangs;
  C. mounting means for said rotatable flyer by which the same is constrained to rotation about an axis transversely intersecting an armature core assembly in the grasp of said core gripping means;
  D. means to sever the stretch of wire leading from the flyer to an armature core assembly in the grasp of said core gripping means, said last named means comprising
    1. wire gripping means operable to grip said stretch of wire,
    2. wire cutting means operable to sever said stretch of wire, said wire cutting means comprising
      a. a movable knife element having a cutting edge, and
      b. mounting means for said movable knife element guiding and constraining the same to movement along a path so disposed with respect to the wire gripping means that the knife element is at all times between the wire gripping means and an armature core assembly in the grasp of the core gripping means, with the cutting edge of the movable knife element transverse to the wire extending from the wire gripping means to the armature core assembly to sever the same upon advance of the knife element at a point between the wire gripping means and the armature core assembly;
    3. mounting means for said wire gripping means and for said wire cutting means, so disposed with respect to the axis about which the flyer rotates that at the time the wire cutting means severs the wire, the wire cutting means is not farther from the axis about which the flyer rotates than the circular orbit defined by the flyer; and
    4. means for actuating the wire gripping means and the wire cutting means in timed relation to one another to effect severance of the wire while the wire gripping means has the wire in its grip.

27.
A coil winding machine for winding a continuous length of wire into a series of connected coils onto the slotted cores of armature core assemblies and attaching the beginning and end of each coil as well as the starting and ending leads of the entire series of coils to tangs of commutators forming part of the armature core assemblies, which tangs are arranged in a circle concentric to the core axis, said machine having 1. core gripping and indexing means operable to grip and hold an armature core assembly with a pair of angularly spaced slots of its core in coil receiving position to have a coil wound therein and to index the same to successively bring other pairs of slots into said position;
2. a flyer rotatable about an axis substantially intersecting and normal to the axis of an armature core assembly held by said core gripping means, and operable to wind wire drawn from a source thereof into the pair of armature core slots in coil receiving position,
   the flyer being constrained to travel in a fixed circular orbit during the winding operation and the wire being wound into said armature core slots having a stretch thereof which leads from the flyer to the core during the winding of each coil and from the flyer to a commutator tang in the intervals between the winding of successive coils; and
3. means to effect attachment of the leads which extend to and from the successively wound coils to selected ones of the circumferentially spaced commutator tangs, and said machine being characterized by:
A. wire cutting means comprising
  1. a tubular finger having a laterally opening notch in its free end in which the wire is received preparatory to being cut;
  2. a plunger axially slidable in said tubular finger with one end thereof projectable through said notch;
  3. a cutting edge on said end of the plunger to coact with one side of the notch in severing the wire; and
  4. means for reciprocatingg the plunger;
B. means mounting said wire cutting means for disposition adjacent to the circle of commutator tangs of an armature core assembly held by said core gripping means;
C. means for effecting relative motion between the wire cutting means and a selected commutator tang to which said stretch of wire leading from the flyer is attached to bring said wire cutting means and said tang into juxtaposition so that upon actuation of the wire cutting means said stretch of wire is cut close to said tang; and
D. means for actuating the wire cutting means.

28. In a flier-type armature winding machine having a winding station, the improvement of apparatus for clamping and severing the wires between successively wound armatures comprising power operated clamp means for engaging and holding the wire extending from a commutator tang of a wound armature at said winding station to a flier, power operated means constructed and arranged to effect severance of the wire at a location within the orbit of the flier and between the wound armature and said clamp means while said clamp means retains clamping engagement therewith, and control means operable to cause said flier to loop the wire about the commutator tang of an unwound armature at said winding station while said clamp means retains clamping engagement with the wire and to effect severance of the wire a second time between said clamp means and said last mentioned commutator tang at a location within the orbit of the flier.

29. In a flier-type armature winding machine, the improvement set forth in claim 28, further characterized in that the means for effecting severance of the wires does so immediately adjacent to the commutator tang to which the wire is attached.

30. In apparatus for winding coils of wire on an armature core mounted on a shaft that also mounts a commutator with tangs to which wire leads extending to and from the coils are attached, the combination of:
A. an inner sleeve surrounding the commutator to shield the tangs;
B. an outer sleeve surrounding the inner sleeve;
C. at least one wire shearing edge on said inner sleeve;
D. at least one wire shearing edge on said outer sleeve,
   said sleeves being relatively movable from a first position in which a wire lead extending from a commutator tang lies between said shearing edges to a second position to effect shearing of the wire lead by coaction of said shearing edges during such relative movement of said sleeves; and
E. power operated means for producing said relative movement of said sleeves.

31. The apparatus defined by claim 30, further characterized by:
A. wire gripping means positioned generally radially outward of said outer sleeve operable to releasably grip a wire lead;
B. means supporting said wire gripping means for movement thereof in a generally radial direction relative to said sleeves and
C. power operated means for moving said wire gripping means in said direction to aid in positioning the wire leads between said shearing edges and in attaching the wire leads to commutator tangs.

32. The apparatus of claim 31, further characterized in that said wire gripping means comprises:
A. a tubular finger having a laterally opening slot to receive a wire lead;
B. a gripping element axially movable in said tubular finger; and
C. power operated means for axially moving said gripping element in one direction to effect gripping of a wire lead in said slot, and in the opposite direction to release the wire lead.

33.30C393911en The apparatus of claim 30, wherein:
A. said inner and outer sleeves are telescoped cylinders that are axially slidable with respect to one another between defined limits and have open ends;
B. the shearing edge on the inner sleeve is at the junction of its outer cylindrical surface with the end surface of its open end;
C. the outer sleeve has a hook at its open end with an axially inwardly facing surface that is spaced from the open end of the inner sleeve when the sleeves are at one limit of their relative axial motion to enable reception of a wire lead between that inwardly facing surface of the hook and the open end of the inner sleeve;

D. the shearing edge on the outer sleeve is on said inwardly facing surface of the hook so that upon inward axial sliding movement of the outer sleeve along the inner sleeve, the shearing edge on the hook moves towards the shearing edge on the outer end of the inner sleeve; and E. said power operated means for producing relative movement between the inner and outer sleeves is effective to slide the outer sleeve axially along the inner sleeve.

34. The apparatus of claim 33, wherein the inner sleeve has at least one notch opening to its outer end to expose a commutator tang for attachment of a wire lead thereto upon axial retraction of the outer sleeve from its shielding position in which it covers said notch, and further characterized by:

A. means for effecting attachment of a wire lead in the grasp of the gripping means to a commutator tang that has been exposed by retraction of the outer sleeve;

B. means for effecting return of the outer sleeve axially along the inner sleeve to its shielding position after the wire lead has been attached to said tang;

C. means for effecting relative rotation of the armature and its commutator with respect to the outer sleeve to bring the stretch of the wire lead extending from the commutator tang to which it is attached into said hook on the outer sleeve; and D. means for again retracting said outer sleeve to draw its hook towards the outer end of the inner sleeve and thereby sever the wire lead.

* * * * *